Figure 1:
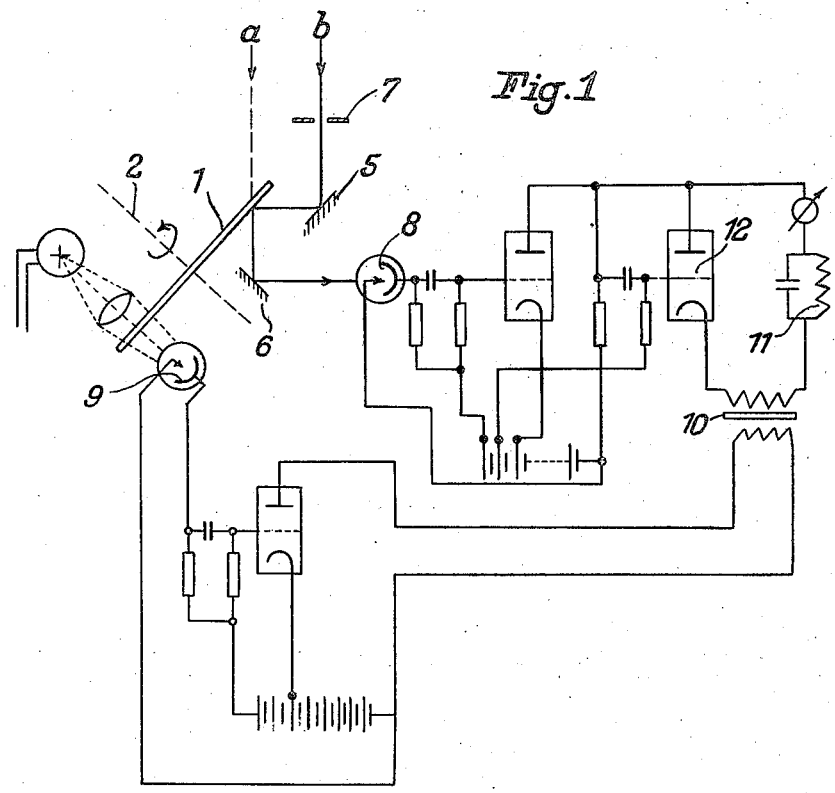

Nov. 19, 1940.    H. BRIEBRECHER    2,222,429
PHOTOELECTRIC SYSTEM FOR SORTING MACHINES
Filed Nov. 6, 1939

Inventor:
Harold Briebrecher
by [signature]
his Attorney

Patented Nov. 19, 1940

2,222,429

UNITED STATES PATENT OFFICE 2,222,429

PHOTOELECTRIC SYSTEM FOR SORTING MACHINES

Harold Briebrecher, Berlin, Germany, assignor to Anton Loibl, G. m. b. H., Berlin, Germany Application November 6, 1939, Serial No. 303,056
In Germany October 28, 1938

3 Claims. (Cl. 250—41.5)

The invention relates to a device for the automatic indication of intensity differences of two light ray-cones.

It is known, to carry out an objective comparison measuring of several light ray-cones by means of blocking layer-photoelectric cells. This method, owing to the very sensitive, electric indicating instruments which are necessary, and, owing to the absolutely necessary accurate gauging of photoelectric cell and indicating instrument, possesses serious inconveniences for the automatic indication. The blocking-layer cell is further much too insensitive for the light intensities which occur and therefore practically useless for comparison measurings.

Devices are known which operate with alkali photoelectric cells, and in which the rectifier cell is exposed alternately in regular succession by both light rays, so that, when intensities of the two rays are similar, the similar light and, when the intensities are different, an alternating light impinges on the photoelectric cell which, in the connected amplifier can be employed for indicating the intensity differences of the two rays.

This device, which indicates an intensity difference of the two rays but does not show which of the two light ray-cones is the lighter one and which is the darker one, has proved to be useless for the automatic testing and assorting, especially when the elements with reflecting or lighting surfaces are manufactured in large quantities, as also the tested pieces, the reflection surfaces of which are above the normal brightness and which are therefore even better, are separated out. The waste thereby would increase unnecessarily, as during the manufacturing it is comparatively difficult to limit the brightness to a narrow range.

The invention relates to a device for the automatic intensity comparison of two light ray-cones, in which only those of the examined pieces are sorted out which remain below the normal brightness, whereas the pieces above this normal brightness are further employed in the manufacturing. Thus it is possible to carry out really perfect tests, the number of pieces sorted out being quite considerably reduced and the number of useful pieces becoming accordingly greater.

According to the invention the alternating potential occurring at an intensity difference of the two rays is impressed on the grid of the connected amplifier and the anode potential of the terminal valve of the amplifier is supplied as alternating potential by a second photoelectric cell circuit, the phase relation existing between grid potential and anode potential being so selected, that a switching element included in the starting circuit of the amplifier, the intensity of the normal ray remaining constant, responds only when the intensity deflection of the comparison ray from the normal takes place in one direction. The alternating exposure of the light sensitive cells can be effected in this case for instance by a rotating transparent disc of glass or other suitable material, subdivided into two or more sectors of similar size, the individual sectors being alternately reflecting and transparent. The two light-rays to be compared impinge from different sides onto the rotating disc, so that the light ray which passes through and the reflected light ray alternately travel the same light way up to the light-sensitive cell. The normal ray can be brought to similar ray intensity with the comparison ray by means of a filter situated in the ray path, or by another light weakening element. The light ray-cone emanating from a separate source of light and impinging onto the second rectifier cell is interrupted in regular succession by the sectors of the rotating disc which are impervious to light, and the alternating potential, which is hereby produced in the corresponding amplifier, is conducted through the intermediary of a transformer to the anode circuit of the first photoelectric cell circuit. The phase relation of this alternating potential can be altered as desired by different arrangement of the second photoelectric cell relative to the rotating disc.

Figure 2:
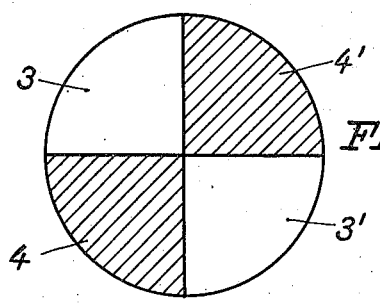

An embodiment of the invention will be hereinafter explained with the aid of the accompanying drawing in which:

Fig. 1 shows the total arrangement of the device according to the invention with two photoelectric-cell circuits, Fig. 2 shows in top plan view the disc with the reflecting sectors.

As shown in Fig. 1, the two parallel light ray-cones $a$ and $b$ impinge onto a glass disc 1 rotating about an axle 2, $b$ representing for instance the normal ray and $a$ the comparison ray. The disc 1 is subdivided, as shown in Fig. 2, into four similar sectors, of which the sectors 3 and 3' are transparent and the sectors 4 and 4' impervious to light owing to a reflecting silver layer on these sectors. The comparison ray $a$ will impinge onto the photoelectric cell from the front side through the transparent sectors and the normal ray $b$ from the rear side of the reflecting sectors, the light ray travels of both rays from the rotating disc to the photoelectric cell being similar. The mirrors 5 and 6 serve for the deflection and guiding of the two light ray-cones. The variable diaphragm 7 enables, the intensity of the normal ray to be made similar to that of the comparison ray, so that in this normal case, when the disc rotates the photoelectric cell 8 is lighted with uniform light, because both light rays impinge onto the photoelectric cell 8 alternately in regular succession and with similar intensity without interruption.

According to the invention a light ray-cone impinging on a second photoelectric cell 9 is interrupted for instance on the opposite side of the rotating disc at a point displaced by 180° by the opaque sectors, and the impulses emitted from the cell 9 are conducted as amplified alternating current, through the intermediary of the transformer 10, to the anode circuit of the amplifier valve 12. In this anode circuit is enclosed a relay 11 for releasing a locking device which retains the test piece in the case the same is not suitable. It is evidently also possible to enclose in this circuit for the observation an indicating instrument or another switch instrument by the responding of which the bad pieces are designated.

The intensity testing of the two light-ray-cones a and b is carried out in the following manner. When the intensity of a and b is similar, the cell 8 is lighted with a uniform light. To the grid of the valve 12 of the coordinated amplifier a negative bias potential is given, so that the alternating current impulses transmitted from the photoelectric cell circuit 9 through the intermediary of the transformer 10 cannot cause any flow of current in the anode circuit of valve 12.

If the comparison ray a is less strong than the normal ray b, an alternating light is fed to the cell 8 and on the grid of the valve 12 an alternating potential will lay which oscillates between a positive and a negative value. The phase of the alternating current impressed on the anode circuit is made, by the local arrangement of the cell 9 and of the source of light belonging to it, such that at the moment at which by the weakening of the comparison light ray a positive grid potential prevails on the valve 12, its anode is also positive and therefore a current can flow in the anode circuit and through the relay 11 which current releases the locking device and separates out the piece to be tested. During the negative grid current period the anode will also be negative, so that, during this time, no current is fed to the relay 11. The current flowing in this instance in the anode circuit is therefore a direct current cut to pieces which in any case will make the relay respond.

If then the comparison ray a is brighter than the normal ray b, the phase position of the alternating potential on the grid of valve 12 will be displaced by 180° compared with the previous case. As the alternating current from the cell 9 preserves its phase position, its anode potential will be this time negative at the moment when the grid potential on the valve 12 is positive. Consequently no current can flow in the relay 11. During the negative grid potential period no current can flow in the relay 11, notwithstanding the positive anode potential, owing to the blocking of the negative grid, and the piece to be tested will therefore in this instance not be separated out.

It is therefore possible to carry out a perfect separating out of bad pieces, i. e. of those pieces, the reflection capability of which is lower than required by the standardization, whereas all pieces remain in the manufacturing process which correspond to this standardization or even exceed the same.

I claim:

1. Device for the indication of light intensity differences of a normal ray cone and a comparison ray cone, comprising in combination a photoelectric cell illuminated in regular succession alternately by both the light ray-cones so that at an intensity difference of the two rays an alternating light impinges onto the photoelectric cell, an amplifier connected to said photoelectric cell, the grid alternating potential of said amplifier being supplied by said photoelectric cell, a terminal valve of said amplifier, a second photoelectric cell circuit for producing the anode alternating potential of said terminal valve, a switching element situated in the output circuit of said amplifier, the phase position between grid and anode potential being selected so that said switching element, when the normal ray is of constant intensity, responds only to the intensity deflection of the comparison ray from the standard ray in one direction.

2. Device for the indication of light intensity differences of a normal ray cone and a comparison ray cone, comprising in combination a photoelectric cell illuminated in regular succession alternately by both the light ray cones so that an inequality therebetween produces a fluctuating light on the cell, an amplifier connected to said cell, the alternating input voltage of said amplifier being supplied by said cell, said amplifier having an output tube with a relay connected in its anode circuit, a second photoelectric cell illuminated by another ray cone from a second light source, a rotating disc divided into alternate transparent and reflecting sectors and interrupting all three of the said light ray cones, a second amplifier connected to said second photoelectric cell and a transformer coupling the output of said second amplifier to the anode circuit of the output tube of said first amplifier, the phase relation between the alternating grid and anode potentials of said output tube being selected such that said relay, when the said normal ray cone is of constant intensity, responds only to the intensity deflection of the comparison ray in one direction.

3. Device for the indication of light intensity differences of a normal ray cone and a comparison ray cone, comprising in combination a photoelectric cell illuminated in regular succession alternately by both the light ray cones so that an inequality therebetween produces a fluctuating light on the cell, an amplifier connected to said cell, the alternating input voltage of said amplifier being supplied by said cell, said amplifier having an output tube with a relay connected in its anode circuit, a second photoelectric cell illuminated by another ray cone from a second light source, a rotating disc divided into alternate transparent and reflecting sectors and interrupting all three of the said light ray cones, a second amplifier connected to said second photoelectric cell and a transformer coupling the output of said second amplifier to the anode circuit of the output tube of said first amplifier, the phase relation between the alternating grid and anode potentials of said output tube being selected such that said relay, when the said normal ray cone is of constant intensity, responds only to the intensity deflection of the comparison ray in one direction, the phase position of the alternating potential supplied by the second photoelectric cell circuit adapted to be altered as desired by altering the arrangement of said second photoelectric cell relative to said rotary disc.

HAROLD BRIEBRECHER.